(12) United States Patent
Voss et al.

(10) Patent No.: US 11,466,713 B2
(45) Date of Patent: Oct. 11, 2022

(54) BOLT CONNECTION FOR CONNECTING TWO FLANGES

(71) Applicant: General Electric Company, Schenectady, NY (US)

(72) Inventors: Stefan Bernhard Voss, Lingen (DE); Ingo Paura, Salzbergen (DE)

(73) Assignee: General Electric Company, Schenectady, NY (US)

(*) Notice: Subject to any disclaimer, the term of this patent is extended or adjusted under 35 U.S.C. 154(b) by 407 days.

(21) Appl. No.: 16/695,351

(22) Filed: Nov. 26, 2019

(65) Prior Publication Data

US 2020/0173471 A1  Jun. 4, 2020

(30) Foreign Application Priority Data

Nov. 29, 2018 (EP) .................................. 18209091

(51) Int. Cl.
  *F16B 5/02* (2006.01)
  *F16B 35/00* (2006.01)
  *F16B 37/00* (2006.01)
  *F16B 43/00* (2006.01)

(52) U.S. Cl.
  CPC ............... *F16B 5/02* (2013.01); *F16B 35/00* (2013.01); *F16B 37/00* (2013.01); *F16B 43/00* (2013.01)

(58) Field of Classification Search
  CPC ........ F16B 5/02; F16B 13/122; F16B 13/124; F16B 13/126; F16B 13/128; F16B 19/02; F16B 19/1081; F16B 19/109; F16B 35/00; F16B 37/00; F16B 43/00
  USPC ..................................................... 411/44, 71
  See application file for complete search history.

(56) References Cited

U.S. PATENT DOCUMENTS

| | | | | |
|---|---|---|---|---|
| 625,230 A | * | 5/1899 | Wiont | B42F 13/12 411/338 |
| 2,006,525 A | * | 7/1935 | Thal | F16B 5/02 29/525 |
| 3,298,725 A | * | 1/1967 | Boteler | B61F 5/26 411/63 |
| 3,603,626 A | * | 9/1971 | Whiteside | F16B 19/02 411/57.1 |
| 4,033,222 A | | 7/1977 | Wilson | |
| 4,102,036 A | | 7/1978 | Salter | |
| 4,822,227 A | | 4/1989 | Duran | |

(Continued)

FOREIGN PATENT DOCUMENTS

| | | |
|---|---|---|
| CN | 108035852 A | 5/2018 |
| GB | 1156629 A | 7/1969 |
| GB | 2206938 A | 1/1989 |

OTHER PUBLICATIONS

European Search Report Corresponding to EP18209091 dated Jun. 17, 2019.

*Primary Examiner* — Roberta S DeLisle
(74) *Attorney, Agent, or Firm* — Dority & Manning, P.A.

(57) ABSTRACT

A bolt connection is provided for connecting two flanges. The bolt connection includes a threaded bar extending through a hole of a first flange and a hole of a second flange, the first flange abutting the second flange; an anti-fatigue sleeve; and a nut. The anti-fatigue sleeve is disposed on the threaded bar on the side of the first flange between the nut and the first flange, the nut is configured to be screwed onto the threaded bar and is configured to press the anti-fatigue sleeve against the first flange to fasten the first flange and the second flange together.

16 Claims, 2 Drawing Sheets

(56) References Cited

U.S. PATENT DOCUMENTS

| | | | | |
|---|---|---|---|---|
| 5,682,678 A | * | 11/1997 | Gallagher | F16B 5/01 |
| | | | | 29/523 |
| 8,641,343 B2 | * | 2/2014 | Mitrovic | F16B 37/122 |
| | | | | 411/338 |
| 2004/0156676 A1 | * | 8/2004 | Boudreaux | F16B 5/0225 |
| | | | | 403/408.1 |
| 2010/0142152 A1 | * | 6/2010 | Li | H01L 23/4006 |
| | | | | 411/181 |
| 2010/0226715 A1 | * | 9/2010 | Schneider | F16B 3/06 |
| | | | | 403/350 |
| 2018/0258970 A1 | * | 9/2018 | Avetisian | F16B 13/045 |
| 2019/0277319 A1 | * | 9/2019 | Ponter | F16B 31/02 |
| 2020/0399892 A1 | * | 12/2020 | Miller | E04G 21/1841 |

\* cited by examiner

BOLT CONNECTION FOR CONNECTING TWO FLANGES

FIELD OF THE INVENTION

This invention deals with a bolt connection for connecting two flanges, and in particular with a bolt connection for horizontal flanges of sections of a segmented steel tower.

BACKGROUND OF THE INVENTION

A wind power plant often has a tubular steel tower that carries the nacelle and the rotor. The tower is sometimes conical (i.e. with a diameter increasing towards the base) in order to increase their strength and stiffness and to save materials the same time. It is difficult or in some areas even impossible to transport such a tubular steel tower in one piece if its diameter exceeds a certain limit (typically 4.3 m). Therefore, a steel tower may be horizontally split into sections of 10 to 40 meters which are split into a number of vertical segments which can be transported to the desired place of assembly. Each segment has a flange and two segments can be reconnected via a vertical joint. After a field assembly test of such a section, it has been determined that it may be difficult to meet the limits for the horizontal flange waviness for separated flanges like they are used for segmented steel Once the steel tower has been assembled, gaps remain between the horizontal flanges. The flange waviness leads to a reduction of the bolt prestress and therefore has an impact on the fatigue life of the bolts.

In order to solve the problem of flange misalignment/waviness, additional measures need to be taken during manufacturing and assembly of the tower sections which lead to an increase of manufacturing time and cost and make it unattractive to use segmented steel towers. Alternatively, on site milling of the flange surface after assembly in the field may be performed combined with shimming of the affected areas. This means that shims are introduced from outside into flange gaps. It has also been suggested to mill the assembled steel tower from outside and to fill liquid material into the gap and cure the liquid material. However, these procedures are not very robust and costly such that other approaches are desirable and should be envisaged.

U.S. Pat. No. 8,393,118 B2 shows a friction damping bold connection for a wind tower lattice structure. It does not teach to use an anti-fatigue sleeve to connect two flanges of a segmented steel tower.

SUMMARY OF THE INVENTION

The invention is defined by the independent claims. Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar or different from the embodiments set forth below.

According to a first aspect, a bolt connection for connecting two flanges is provided. The bolt connection includes a threaded bar extending through a hole of a first flange and a hole of a second flange, the first flange abutting the second flange; an anti-fatigue sleeve; and a nut. The anti-fatigue sleeve is disposed on the threaded bar on the side of the first flange between the nut and the first flange, the nut is configured to be screwed onto the threaded bar and is configured to press the anti-fatigue sleeve against the first flange to fasten the first flange and the second flange together.

According to a second aspect, it is described to use of the bolt connection according to the first aspect to connect sections of a steel tube tower.

According to a third aspect, a method is provided of connecting two flanges. The method includes placing a threaded bar through a hole of a first flange and a hole of a second flange. The first flange abuts the second flange. An anti-fatigue sleeve is placed onto the threaded bar on the side of the first flange between a nut, disposed on the threaded bar, and the first flange. The nut is screwed onto the threaded bar such that it presses the anti-fatigue sleeve against the first flange to fasten the first flange and the second flange together.

DESCRIPTION OF THE EMBODIMENTS

Figure 1:
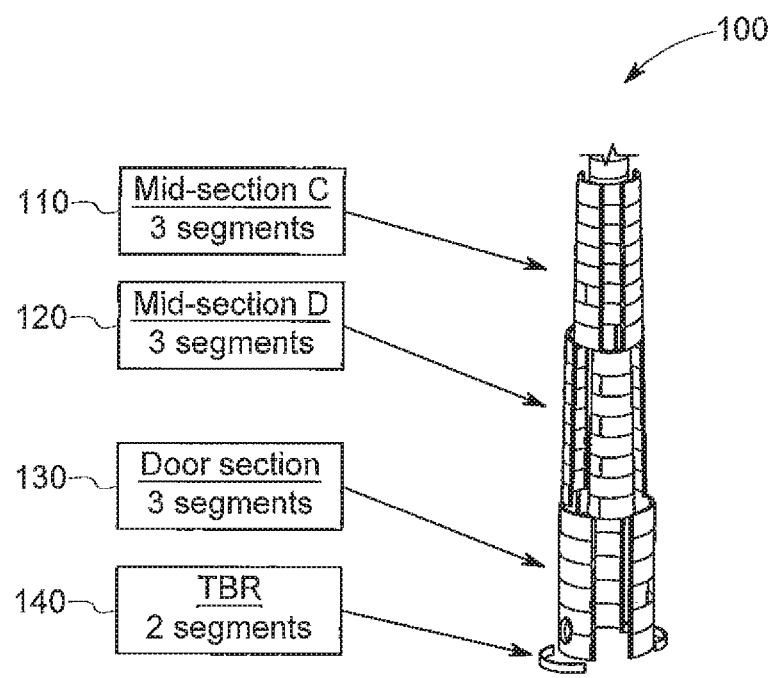
FIG. 1 shows a segmented steel tower in which a bolt connection according to embodiments of the invention can be used to connect horizontal flanges.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Reference will now be made in detail to the various embodiments, one or more example of which are illustrated in the figures. Each example is provided by way of explanation and is not meant as a limitation. For example, features illustrated or described as part of one embodiment FIG. 1 shows a segmented steel tower 100 in which a bolt connection according to embodiments of the invention can be used to connect flanges of sections. However, before continuing with the description of FIG. 1, a few items of the invention will be discussed.

The solution to overcome the above-mentioned problem of loss of bolt fatigue life resulting from flange misalignment/waviness is to use longer threaded bars with an anti-fatigue sleeve pressed against the horizontal flange which exceeds the waviness requirements which have to be met in order to be able to connect the flanges. The technical effect of the invention is that the impact of a flange misalignment is much lower on a longer clamp length because the relative loss of pre-stress is lower. Therefore, the impact on the lifetime of the threaded bar resulting from the flange misalignment is negligible. The threaded bar with a long anti-fatigue sleeve leads to an increase of the clamp length. The flange misalignment therefore leads to a much smaller relative loss of bolt tension, increasing the lifetime of the bolt connection. This flange connection method enables the use of segmented steel tower sections. It was detected that it is difficult to fulfill the requirements for the horizontal flange waviness. The bolt connection according to embodiments of the invention is robust against this waviness.

In some of the embodiments, a bolt connection is provided for connecting two flanges. The bolt connection includes a threaded bar extending through a hole of a first flange and a hole of a second flange, the first flange abutting the second flange; an anti-fatigue sleeve; and a nut. The anti-fatigue sleeve is disposed on the threaded bar on the side of the first flange between the nut and the first flange. The nut is configured to be screwed onto the threaded bar and is configured to press the anti-fatigue sleeve against the first flange to fasten the first flange and the second flange together. Thereby, the bolt connection can be used with flanges which have a waviness that would normally not allow the flanges to be connected.

In some of these embodiments, an end piece of the threaded bar abuts the second flange.

In some of these embodiments, a washer is disposed between at least one of the anti-fatigue sleeve and the first flange, the end piece and the second flange and the anti-fatigue sleeve and the nut.

In other embodiments, the nut is a first nut and the anti-fatigue sleeve is a first anti-fatigue sleeve. The embodiment includes a second nut and a second anti-fatigue sleeve. The second anti-fatigue sleeve is configured to be placed onto the threaded bar on the side of the second flange between the second nut and the second flange. The second nut is configured to be screwed onto the threaded bar and is configured to press the second anti-fatigue sleeve against the second flange.

In some of these embodiments, a washer is disposed between at least one of the first anti-fatigue sleeve and the first flange, the second anti-fatigue sleeve and the second flange, the first anti-fatigue sleeve and the first nut and the second anti-fatigue sleeve and the second nut.

In some embodiments, the length of the anti-fatigue sleeve is at least twice the thickness of the first flange and the second flange.

In some embodiments, the anti-fatigue sleeve has a length of at least 300 mm. Typically, anti-fatigue sleeves have a length much smaller than 300 mm such that anti-fatigue sleeves of this length are not known from the prior art. Moreover, the use of anti-fatigue sleeves for connecting flanges of sections of steel towers is also not known from the prior art. In some of the embodiments, the anti-fatigue sleeve has a diameter between 25 mm and 100 mm.

In some embodiments, the threaded bar has a length of at least 500 mm. In some of the embodiments, the threaded bar has a diameter between 20 mm and 80 mm. In some embodiments, each of the first and second flanges has a thickness of at least 100 mm.

In some of the embodiments, the first flange and the second flange are horizontal flanges of sections of a segmented steel tower.

In some of the embodiments, the first flange and the second flange are circumferential flanges.

In some of the embodiments, the connecting areas of the first flange and the second flange exceed given waviness requirements for sufficient fatigue strength of the flange connection.

In some of the embodiments, the first flange and the second flange are exposed to high dynamic stress as it typically occurs at the towers of wind power plants.

Some embodiments relate to the use of the bolt connection of any one of the preceding embodiments to connect segments of a steel tube tower.

Some embodiments refer to a steel tube tower which includes sections. The bolt connection of any one of the embodiments described above is used to reconnect sections when assembling the tower. The first flange is part of a first section of the steel tube tower and the second flange is part of a second section of the steel tube tower.

In some of the embodiments, the first flange and the second flange are horizontal flanges.

In some of the embodiments, the connecting areas of the first flange and the second flange exceed given waviness requirements for sufficient fatigue strength of the flange connection.

In some of the embodiments, a section of the steel tube tower has a diameter of above 4.3 m. Typically, steel tube sections with a diameter below 4.3 m can be transported in one piece, while steel tube sections above this diameter have to be split into segments in order to be able to be transported.

In some of the embodiments, the steel tube tower is a tower of a wind power plant.

Some of the embodiments relate to a method of connecting two flanges. The method includes placing a threaded bar through a hole of a first flange and a hole of a second flange. The first flange abuts the second flange. Then, an anti-fatigue sleeve is placed onto the threaded bar on the side of the first flange between a nut, disposed on the threaded bar, and the first flange. The nut is screwed onto the threaded bar such that it presses the anti-fatigue sleeve against the first flange to fasten the first flange and the second flange together.

In some of these embodiments, the nut is a first nut and the anti-fatigue sleeve is a first anti-fatigue sleeve. The method further includes placing a second anti-fatigue sleeve onto the threaded bar on the side of the second flange between a second nut disposed on the threaded bar and the second flange. The second nut is screwed onto the threaded bar and presses the second anti-fatigue sleeve against the second flange.

It should be mentioned that the features disclosed with regard to the bolt connection may also be used in the embodiments relating to the steel tower and the method of connecting two flanges.

Returning now to FIG. 1 which shows a segmented steel tower 100 that has a mid-section C 110, a mid-section D 120, a door-section 130 and a tower base ring (TBR) 140. Each section is further divided into a number of segments.

Figure 2:
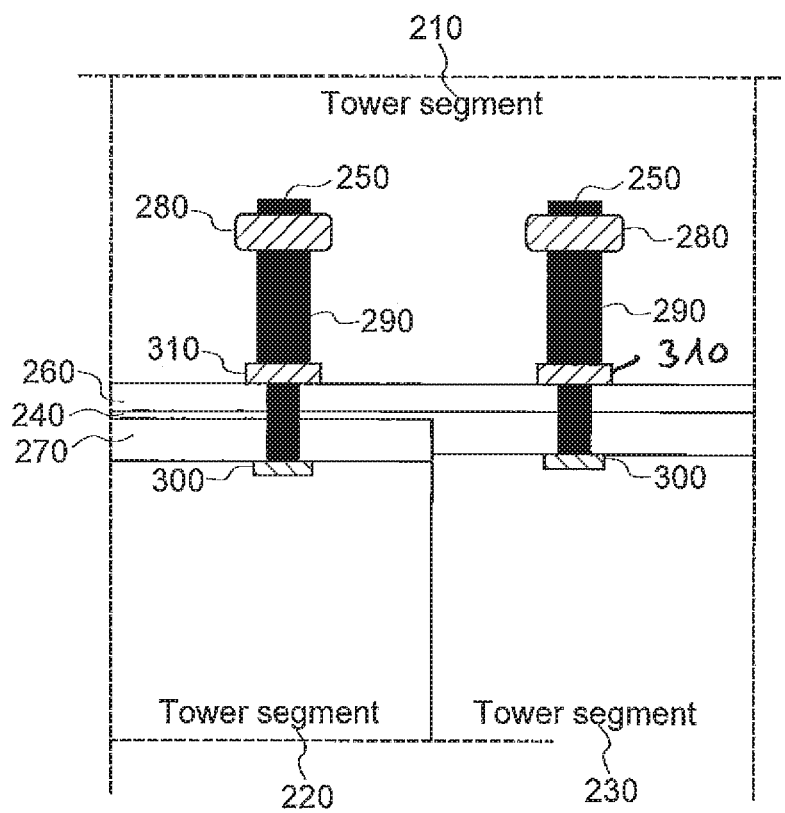
FIG. 2 shows a bolt connection according to embodiments of the invention in which an anti-fatigue sleeve and a nut are disposed on the side of the first flange only.

FIG. 2 shows the encircled part of the segmented steel tower 100 in greater detail and shows a bolt connection which allows to connect a tower segment 210 of mid-section C 110 to a tower segment 220 of mid-section D 120 and a tower segment 230 of mid-section D 120. Due to the waviness of the first flange 260 and the second flange 270 (which do not comply with waviness requirements), a flange gap 240 exists between the tower segment 220 and the tower segment 210. However, this flange gap 240 is not problematic due to the bolt connection which has a long threaded bar 250 which extends through and beyond the holes of the first flange 260 and the second flange 270. A nut 280 is screwed onto the threaded bar 250 and presses an anti-fatigue sleeve 290 against the first flange 260. An end piece 300 of the threaded bar 250 abuts the second flange 270 and is pressed onto it. Moreover, a washer 310 is disposed between the anti-fatigue sleeve 290 and the first flange 260. A further washer (not shown) could be placed between the end piece 300 and the second flange 270 and/or between the nut 280 and the anti-fatigue sleeve 290.

Figure 3:
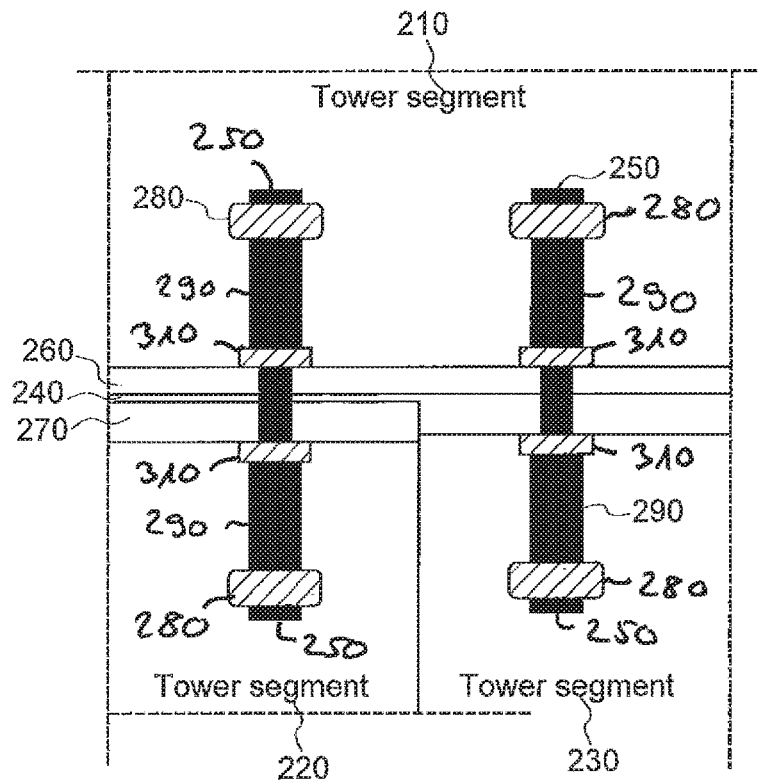
FIG. 3 shows a bolt connection according to embodiments of the invention in which an anti-fatigue sleeve and a nut are each disposed on the side of the first flange and on the side of the second flange.

FIG. 3 shows another embodiment of a bolt connection which allows to connect a tower segment 210 of mid-section C 110 to a tower segment 220 of mid-section D 120 and a tower segment 230 of mid-section D 120. In this embodiment, the threaded bar 250 is even longer than in the embodiment shown in FIG. 2. Instead of the end piece 300, a second anti-fatigue sleeve 320 is pressed by means of a second nut 330 against the second flange 270. Washers 310 are placed between the first and second flanges 260, 270 and the anti-fatigue sleeves 290. Further washers (not shown) could be placed between the anti-fatigue sleeves 290 and the nuts 280.

Figure 4:
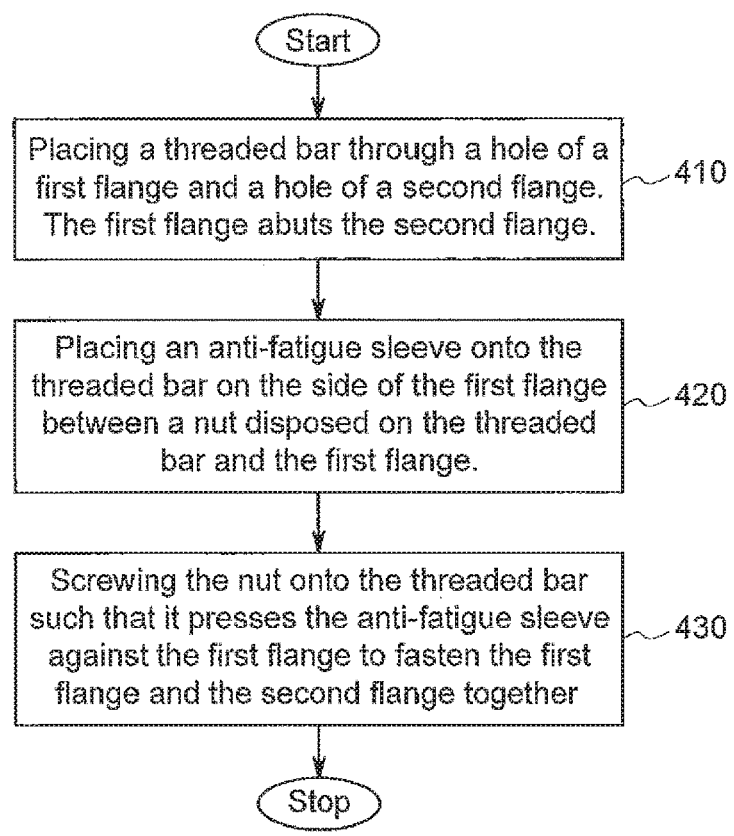
FIG. 4 shows a flowchart for illustrating a method for connecting flanges according to embodiments of the invention.

FIG. 4 shows a flowchart for illustrating the method of connecting two flanges. At 410, a threaded bar with an end piece is placed through a hole of a first flange and a hole of a second flange. The first flange abuts the second flange. At 420, an anti-fatigue sleeve is placed onto the threaded bar on the side of the first flange between a nut, disposed on the threaded bar, and the first flange. At 430, the nut is screwed onto the threaded bar such that it presses the anti-fatigue sleeve.

The foregoing description of various aspect of the invention has been presented for purpose of illustration and description. It is not intended to be exhaustive or to limit the invention to the precise form disclosed, and many modifications and variations are possible. Such modifications and variations that may be apparent to an individual in the art are included within the scope of the invention defined by the accompanying claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, of if they include equivalent structural elements with insubstantial differences from the literal languages of the claims.

The invention claimed is:

1. A tubular tower structure, comprising:
a plurality of tower sections,
a bolt connection for connecting two flanges of adjacent tower sections of the plurality of tower sections, the bolt connection being used to reconnect at least two of the plurality of tower sections when assembling the tubular tower structure, the bolt connection comprising:
a threaded bar extending through a hole of a first flange of the two flanges and a hole of a second flange of the two flanges, the first flange abutting the second flange, the first flange being part of a first tower section of the plurality of tower sections and the second flange being part of a second section of the plurality of tower sections;
an anti-fatigue sleeve; and
a nut;
wherein the anti-fatigue sleeve is disposed on the threaded bar on a side of the first flange between the nut and the first flange,
wherein the nut is configured to be screwed onto the threaded bar and is configured to press the anti-fatigue sleeve against the first flange to fasten the first flange and the second flange together.

2. The tubular tower structure of claim 1, wherein an end piece of the threaded bar abuts the second flange.

3. The tubular tower structure of claim 2, wherein a washer is disposed between at least one of the anti-fatigue sleeve and the first flange, the end piece, and the second flange and the anti-fatigue sleeve and the nut.

4. The tubular tower structure connection of claim 1, wherein the nut is a first nut and the anti-fatigue sleeve is a first anti-fatigue sleeve, the bolt connection further comprising a second nut and a second anti-fatigue sleeve, wherein the second anti-fatigue sleeve is configured to be placed onto the threaded bar on the side of the second flange between the second nut and the second flange, the second nut is configured to be screwed onto the threaded bar and is configured to press the second anti-fatigue sleeve against the second flange.

5. The tubular tower structure of claim 4, wherein a washer is disposed between at least one of the first anti-fatigue sleeve and the first flange, the second anti-fatigue sleeve and the second flange, the first anti-fatigue sleeve and the first nut and the second anti-fatigue sleeve and the second nut.

6. The tubular tower structure of claim 1, wherein a length of the anti-fatigue sleeve is at least twice the thickness of the first flange and the second flange.

7. The tubular tower structure of claim 1, wherein the anti-fatigue sleeve has a length of at least 300 mm.

8. The tubular tower structure of claim 1, wherein the threaded bar has a length of at least 500 mm.

9. The tubular tower structure of claim 1, wherein each of the first and second flanges has a thickness of at least 50 mm.

10. The tubular tower structure of claim 1, wherein the first flange and the second flange are horizontal flanges of the first and second tower sections.

11. The tubular tower structure of claim 1, wherein the first flange and the second flange are circumferential flanges of the first and second tower sections.

12. The tubular tower structure of claim 1, wherein connecting areas of the first flange and the second flange exceed given waviness requirements for a durable prestressed connection of the first flange and the second flange.

13. The tubular tower structure of claim 1, wherein the first flange and the second flange are exposed to high dynamic stress.

14. The tubular tower structure of claim 1, wherein a section of the steel tube tower has a diameter of above 4.3 m.

15. The tubular tower structure of claim 1, wherein the tubular tower structure is a tower of a wind power plant.

16. A method of connecting two flanges of a tubular tower structure, the method comprising:
- providing a plurality of tower sections of the tubular tower structure, the plurality of tower sections comprising, at least, a first tower section and a second tower section;
- placing a threaded bar through a hole of a first flange of the first tower section of the plurality of tower sections and a hole of a second flange of the second tower section of the plurality of tower sections, the first flange abutting the second flange;
- placing an anti-fatigue sleeve onto the threaded bar on a side of the first flange between a nut, disposed on the threaded bar, and the first flange; and
- screwing the nut onto the threaded bar such that the nut presses the anti-fatigue sleeve against the first flange to fasten the first flange and the second flange together so as to join the first and second tower sections together.

\* \* \* \* \*